Sept. 16, 1941.   W. ROTSCHEIDT   2,255,816
IMPULSE REPEATING ARRANGEMENT
Filed May 11, 1939
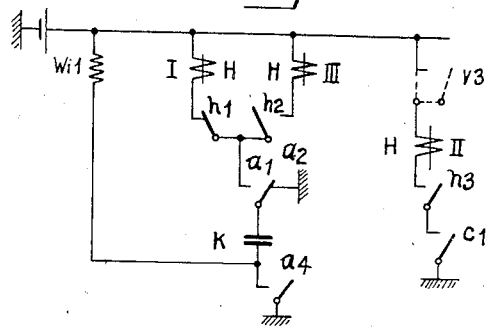
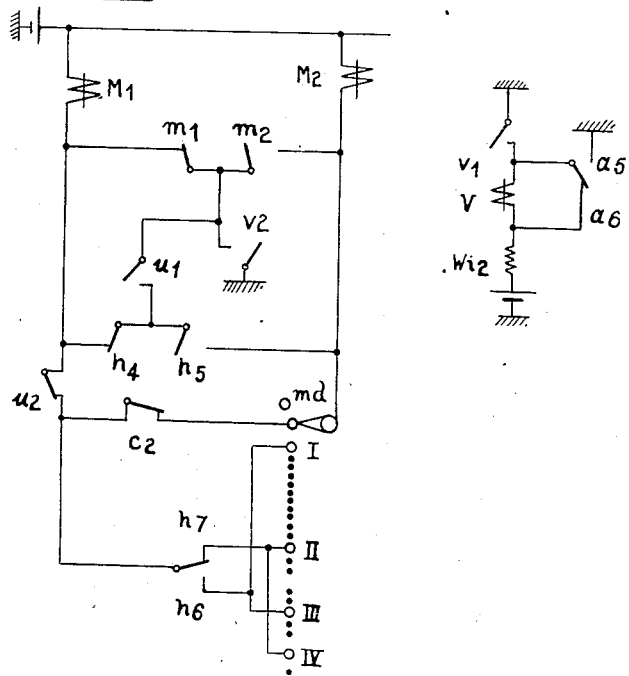
INVENTOR
WILHELM ROTSCHEIDT
BY
ATTORNEY Patented Sept. 16, 1941

2,255,816

UNITED STATES PATENT OFFICE 2,255,816

IMPULSE REPEATING ARRANGEMENT

Wilhelm Rotscheidt, Berlin-Charlottenburg, Germany, assignor to Fides Gesellschaft für die Verwaltung und Verwertung von gewerblichen Schutzrechten mit beschränkter Haftung, Berlin, Germany, a corporation of Germany Application May 11, 1939, Serial No. 272,970
In Germany May 16, 1938

9 Claims. (Cl. 179—16)

The present invention relates to a circuit arrangement to reduce the frequency of a given impulse train for remote control apparatus, more especially telephone apparatus.

There are known arrangements for the reduction of the frequency of an impulse train by which, in order to repeat the train with reduced frequency a marginal relay controlled by the charging impulses of a condenser is used.

This arrangement has the disadvantage that a relay of special construction is necessary, also the condenser used to operate the relay is comparatively large.

By means of the invention it is possible to use an ordinary relay while, at the same time, reducing the magnitude of the condenser. This is attained by the relay, which receives the pulses and repeats them with halved frequency, being controlled by the charge and discharge impulses of a condenser which, during the intervals between impulses is charged with a definite polarity and voltage and during the current impulses is discharged by means of reversed connection to the charging source with double this potential difference through the relay windings. A selector of this type is fully disclosed in United States Patent No. 1,978,700, granted October 30, 1934, to Fritz Döring, et al.

Fig. 1 shows one example of carrying the invention into effect. Fig. 2 shows the application of the invention to the control of a motor-drive selector for telephone installations.

The method of operation of the arrangement shown in Fig. 1 is as follows:

The impulses sent out are accepted by a current pulse relay A (not shown) which corresponds to relay A in Fig. 11 of the before-mentioned patent to Döring et al. Relay A operates at each pulse and releases during the intervals between pulses. When the arrangement is at rest the condenser K is charged over the following circuit: earth, contact $a2$, condenser K, resistance W$i1$, battery, earth. The plates of the condenser K have a given polarity and potential. When relay A operates, on a received current pulse, contact $a2$ is opened and contacts $a4$ and $ai$ are closed. The polarity of the plates of the condenser is thereby reversed, the condenser discharges and charges itself but in the opposite sense in the following circuit: earth, contact $a4$, condenser K, contacts $ai$, $hi$, winding I of relay H, battery, earth. Relay H operates. Since the potential difference of the circuit which contains the condenser K is double that originally charging the condenser, the potential energy of the condenser rises and with the square of the potential difference i. e. about four times $(A = \frac{1}{2} C. U^2)$.

Therefore, for the operation of relay H, it is sufficient to provide a proportionately smaller condenser. Relay H after operating breaks its energizing circuit at the contact $hi$, but locks up in the following circuit: contact $ci$ (busy relay not shown, corresponding to relay C in the patent to Döring et al.), contact $h3$, winding II of the relay, battery, earth.

At contact $h2$ a circuit for energising winding III of the relay H is prepared. The operation of this winding by the condenser K does not take place at this stage, since the condenser K is already charged through the winding I.

At the end of the current pulse relay A releases. Condenser K is thereupon discharged and again charged in the original direction over the following circuit: earth, contact $a2$, condenser K, resistance W$i1$, battery, earth. When the next current pulse arrives, relay A again operates, condenser K discharges and charges in the reverse direction in the following circuit: earth, contact $a4$, condenser K, contacts $ai$, $h2$, winding III of relay H, battery, earth. An opposing field is produced in the winding II of the relay by the discharge and charging pulses of condenser K which releases the winding II. The holding circuit for the winding II of the relay H is thereby opened at contact $h3$ and at contact $h2$ the differential compound winding is interrupted and winding I of relay H is again placed in circuit at contact $hi$. When the current impulse ends, relay A again releases and the condenser is newly charged while, on the receipt of the next current impulse, A operates again and energises relay H over winding I which is held over its winding II independently of the cut-off circuit until, at the next current impulse, the relay is released by the differential compound winding III. During a current impulse and the subsequent break, relay H is energised while, during the next impulse and its subsequent break it is de-energised.

The arrangement according to the invention can be utilised for the transmission of current impulses over a junction line in which the relay H is the repeating relay, repeating the received pulses at half the receiving frequency. As Fig. 2 shows, it can also be used for the control of selectors, which in this example are of a motor drive type.

In Fig. 2 the magnets M$i$ and M$2$ are the two energising windings of the motor of the selector.

They are, in known manner, set at 90 degrees to one another and attract the motor armature alternately. Magnets M1 and M2 energise alternately in a cyclic manner and the contacts $m1$ and $m2$ are alternately operated by a cam disc on the motor shaft. When the winding M1 is energised, the contact $m1$ is opened and contact $m2$ closed. Conversely, when M2 is energised, $m2$ is opened. Windings M1 and M2 are alternately switched in over contacts $m1$ and $m2$. It should also be noted that the selector is stepped once at each energisation of the windings M1 or M2. The received pulses are transmitted to the windings M1 and M2 by means of the relay H of Fig. 1. The selector as shown operates as a line selector and is set by two impulse trains of which the first selects the required decade and the second the individual contact in the selected decade. As the selector is of the rotary type, while selecting the decade it moves at a high velocity over the contacts in the decades until it rests on the first contact of the selected decade. The selector is moved by the units position selection from the first contact to the desired line by single steps.

The control of the motor selector shown in Fig. 2 is effected by the arrangement of Fig. 1 in the following manner:

On the seizure of the selector a busy relay C (not shown) is energised and closes its contact $c1$ opening contact $c2$. The holding circuit of relay H is prepared over contact $c1$. The motor selector is made ready for the decade selection by the opening of contact $c2$. On receipt of a current impulse the current impulse receiving relay A energises relay H (Fig. 1) and also relay V (Fig. 2). The circuit for relay V is: earth, contact $a5$, winding of relay V, resistance W12, battery, earth. Relay V holds itself over its contact $v1$ during the current impulse train during which time it is impulsively short-circuited by contact $a6$. After relay V energises, the following circuit for the energising winding M1 of the motor is closed: earth, contacts $v2$, $m1$, energising winding M1, battery, earth.

The selector makes a step and moves its control wiper $md$ from the position 0 to position 1. The selector is stopped at the rest position of the first decade at which the selector is held since both energising windings M1 and M2 are conducting current. When winding M1 is energised contact $m1$ is opened, contact $m2$ closed and winding M2 also receives current as follows: earth, contacts $v2$, $m2$, winding M2, battery, earth. The following holding circuit is closed over the winding M1: earth, contacts $v2$, $m2$, test wiper $md$, rest position 1, contacts $h6$, $u2$, winding M1, battery, earth.

At the termination of the current impulse, relay A releases and relay H (Fig. 1) is held during the subsequent break in the following circuit: earth, contacts $c1$, $h3$, winding II of relay H, contact $v3$, battery, earth. When the next current pulse is received relay H is released. Contact $h6$ (Fig. 2) is opened and contact $h7$ closed. The operation of contacts $h4$ and $h5$ is, at this stage, without effect. The circuit for the winding M1 is interrupted by opening of contact $h6$. Winding M2 alone is energised and attracts its armature. The selector makes a further step, opening contact $m2$ and closing $m1$. Since the individual contacts between the rest position I and the rest position II are not connected to a source of potential, winding M1 alone is energized after this step. The selector makes a further step. As a consequence contact $m1$ is again opened and contact $m2$ closed. The winding M2 conducts current and the selector makes a further step. This process continues until the rest position II of the second decade is attained. In this position the selector is held for a short time since both motor windings are conducting current. Winding M2 is energised in the following circuit: earth, contacts $v2$, $m2$, test wiper $md$, rest position II, contacts $h7$, $u2$, winding M1, battery, earth.

On receipt of the third current impulse relay H (Fig. 1) is again energised. Contact $h7$ is opened, contact $h6$ closed. When contact $h7$ opens winding M1 is deprived of current, winding M2 alone is energised and the selector again commences to rotate. It traverses the 10 individual contacts between rest positions II and III with great velocity. The selector is held in position III since both windings M1 and M2 are conducting current.

The winding M2 is energised in the following circuit: earth, contacts $v2$, $m2$, winding M2, battery, earth. Winding M1 is energised in the following circuit: earth, contacts $v2$, $m2$, test wiper $md$, rest position III, contacts $h6$, $u2$, winding M1, battery, earth. If it is assumed that the tens selection is completed after three pulses, the current pulse receiving relay now releases.

Relay V is short-circuited at contact $a6$ and eventually releases. The holding circuit of relay H is broken at contact $v3$. Relay H releases. When relay V releases, a change-over relay U (not shown) is energised in the same manner as is relay U in the patent to Döring et al., referred to, and effects the change-over from the tens to the units selection. Relay U opens its contact $u2$ and closes contact $u1$.

The units selection now follows and is assumed to be effective by five current pulses. On receipt of the first current pulse relays A, H and V operate. Winding M2 is energised in the following circuit: earth, contacts $v2$, $m2$, winding M2, battery, earth. The selector makes one step. By the energisation of winding M2, contact $m2$ is opened and contact $m1$ closed. In spite of the opening of contact $m2$, the selector does not rotate automatically as in the tens selection but is held since both windings M1 and M2 are conducting current. Winding M1 is energised in the following circuit: earth, contacts $v2$, $m1$, winding M1, battery, earth. Winding M2 is energised in the following circuit: earth, contacts $v2$, $u1$, $h5$, winding M2, battery, earth. On the receipt of the next current pulse relay H releases and breaks the circuit for the winding M2, the winding M1 alone is conducting current. The selector makes a further step. After this it is held since both magnet windings are again conducting current; winding M2 being energised in the following circuit: earth, contacts $v2$, $m2$, winding M2, battery, earth. Winding M1 is energised in the following circuit: earth, contacts $v2$, $u1$, $h4$, winding M1, battery, earth. On receipt of the third current pulses relay H is again energised and the circuit for winding M1 is opened at contact $h4$. Winding M2 alone conducts current. The selector makes a further step. After this step it is again held until the next current pulse is received. The selector is rotated in this manner step by step until it reaches the contact 5. Since at this stage the current pulse train is ended, relays A, H and V release. At contact $v2$ the circuit for the energising windings M1 and M2 is finally broken and the selector is set, in the example given, on the contact 5 of the third decade.

At the end of the connection the return of the selector to normal is effected in a manner which is not of significance to the invention.

I claim:

1. In combination, a condenser, a source of direct current, means for connecting said condenser to said source to charge the condenser, a relay, and means operated after the condenser has been charged to connect the charged condenser and said source in series with said relay to energize the relay, said condenser and said source being so poled in said series circuit that the effective total potential impressed by them upon said relay is greater than the potential of either said condenser or said source alone.

2. In combination, a condenser, a source of direct current, a relay, means operated to connect said condenser periodically to said source to charge the condenser and, after each such connection, to connect the source and said charged condenser in series with said relay, said condenser and said source being so poled in said series circuit that the effective total potential impressed by them upon said relay is greater than the potential of either said condenser or said source alone, said relay having means for causing the current from said source and condenser in series to operate said relay upon alternate connections thereof to the relay, and said last means effective after each operation of said relay to cause the succeeding connection of said source and condenser in series with the relay to restore said relay to normal.

3. In combination as claimed in claim 2, a switch of the type whose wipers are driven by the cyclic energization of a plurality of motor magnets, and contacts on said relay to control said magnets to move the wipers of said switch step by step.

4. In a combination as claimed in claim 2, a switch having a test wiper and an associated bank of contacts, means controlled by said relay for marking one or more predetermined contacts in said bank only when the relay is at normal and for marking one or more other contacts therein only when the relay is operated, and means controlled over said test wiper for halting the switch when said wiper engages any of said marked contacts and, responsive to the removal of the marking therefrom by said relay, operating the switch in search for another contact marked by said relay.

5. In combination, a condenser, a circuit for charging said condenser in one direction, a circuit for charging said condenser in the opposite direction, means operated by impulses to connect said condenser alternately to said two circuits, whereby the connection of said condenser to one of said circuits causes the charge received by it in the other circuit first to be neutralized and then to be replaced by a charge of the opposite polarity, and a relay in said one circuit responsive to the flow of neutralizing and charging current when said condenser is connected to that circuit.

6. In combination, a condenser, a circuit for charging said condenser in one direction, a circuit for charging said condenser in the opposite direction, means operated by impulses to connect said condenser alternately to said two circuits, whereby the connection of said condenser to each of said circuits causes the charge received by it in the other circuit first to be neutralized and then to be replaced by a charge of the opposite polarity, a relay having two windings, means for connecting one of said windings in said first circuit only when the relay is at normal and for connecting the other winding therein only when the relay is in operated position, said one winding effective when connected in said first circuit and energized by the flow of neutralizing and charging current therein to operate said relay, and said other winding effective when connected in said first circuit and energized by the flow of neutralizing and charging current therein to restore the relay to normal.

7. In combination, a condenser, a circuit for charging said condenser in one direction, a circuit for charging said condenser in the opposite direction, means operated by impulses to connect said condenser alternately to said two circuits, whereby the connection of said condenser to one of said circuits causes the charge received by it in the other circuit first to be neutralized and then to be replaced by a charge of the opposite polarity, a multi-winding relay having one of its windings connected in said one circuit only when the relay is at normal, said one winding at times being energized by the flow of neutralizing and charging current upon connection of said condenser to said one circuit and effective to operate said relay, means controlled by the relay upon operating for energizing a second of the relay windings to maintain it in operated position, and a differential winding on said relay connected in said one circuit only when the relay is in operated position and at times energized by the flow of neutralizing and charging current upon connection of said condenser to said one circuit to restore the relay to normal.

8. In combination, a relay adapted to assume either of two alternative positions, one winding on said relay effective when energized to operate said relay to one of said positions, a second winding on said relay effective when energized to operate said relay to the other of said positions, said relay effective after a momentary energization of either of said windings to remain in the position to which it was operated by said momentary energization until the other of said windings is energized, a condenser, a charging circuit for said condenser, a first discharge circuit for the condenser including said first winding and a contact of said relay which is closed only when the relay is in said other position, a second discharge circuit for the condenser including said second winding and a contact of said relay which is closed only when the relay is in said one position, whereby the one of said discharge circuits effective at any time depends upon the position assumed by the relay at that time, and impulse operated means for connecting said condenser alternately to said charging circuit and the effective discharge circuit thereby to energize the windings of said relay alternately.

9. In combination, a relay adapted to assume either of two alternative positions, one winding on said relay effective when energized to operate the relay to one of said positions, a second winding on said relay effective when energized to operate the relay to the other of said positions, said relay effective after a momentary energization of either of said windings to remain in the position to which it was operated by said momentary energization until the other of said other windings is energized, a condenser, a first charging circuit for said condenser including said first winding and a contact of said relay which is closed only when the relay is in said other position, a second charging circuit for said condenser including said second winding and a contact of said relay which is closed only when the relay is in said one position, whereby the one of said circuits effective at any time depends upon the position assumed by the relay at that time, a discharge circuit for the condenser, and impulse operated means for connecting said condenser alternately to the effective charging circuit and said discharge circuit thereby to energize the windings of said relay alternately.

WILHELM ROTSCHEIDT.